Figure 2:
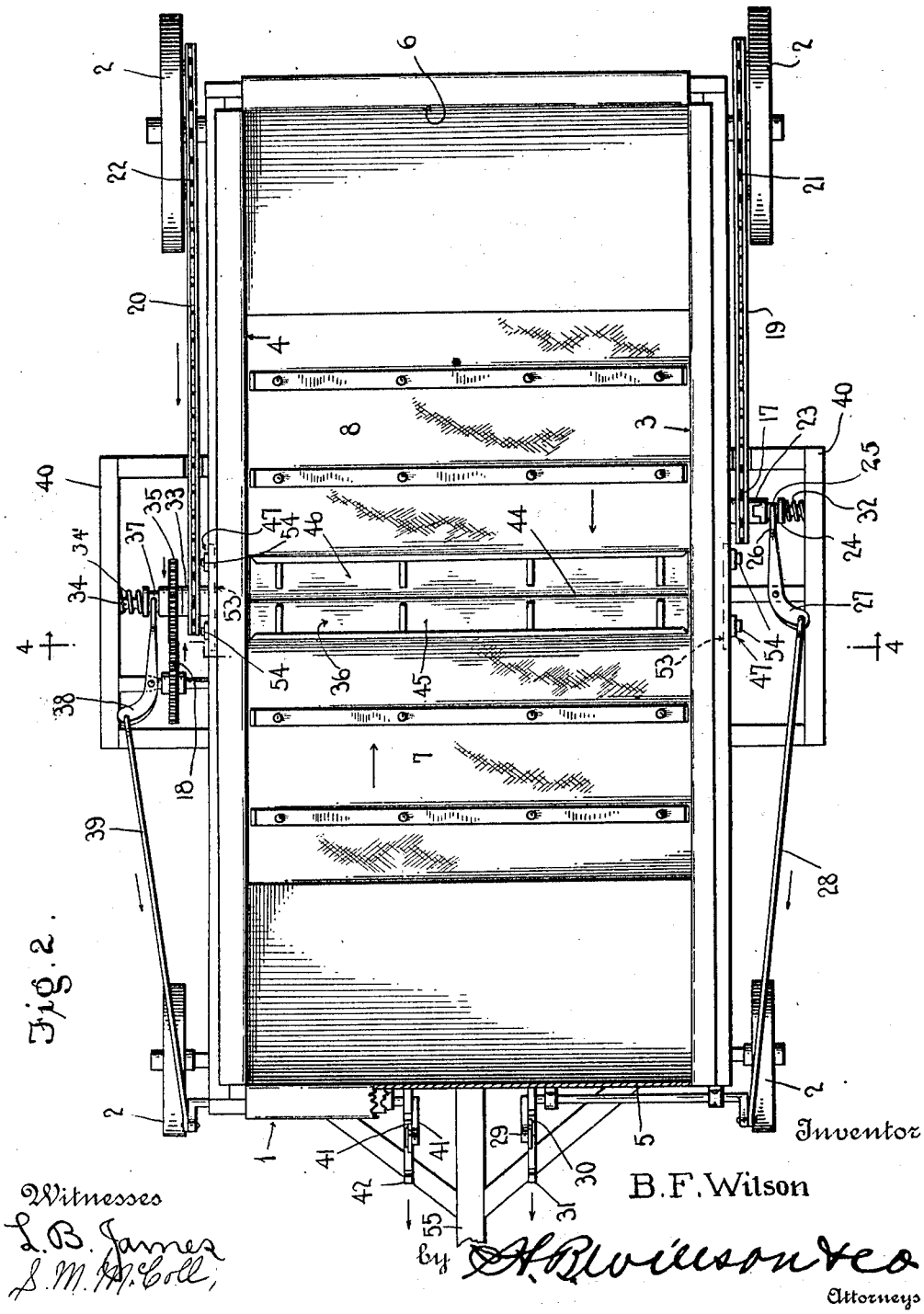

B. F. WILSON.
STRAW SPREADER.
APPLICATION FILED APR. 16, 1912.
1,051,847.
Patented Jan. 28, 1913.
3 SHEETS—SHEET 1.
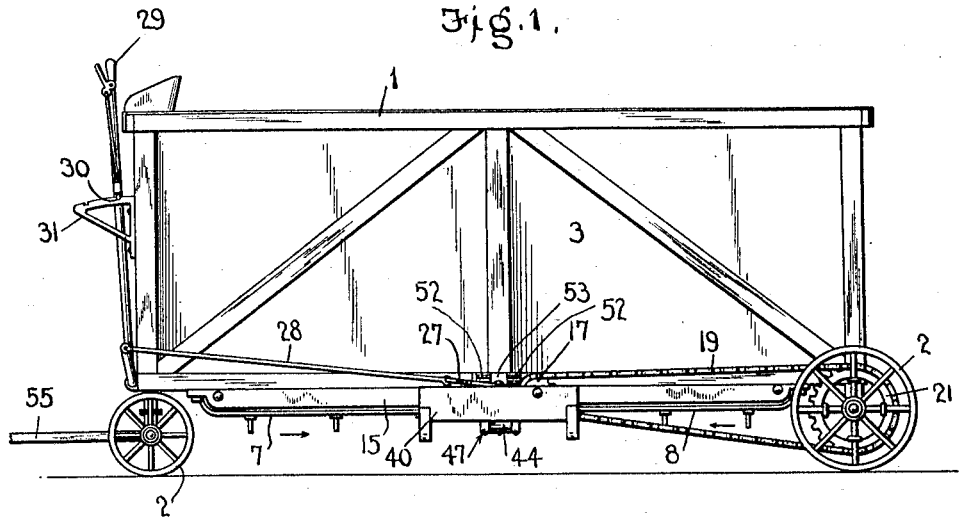
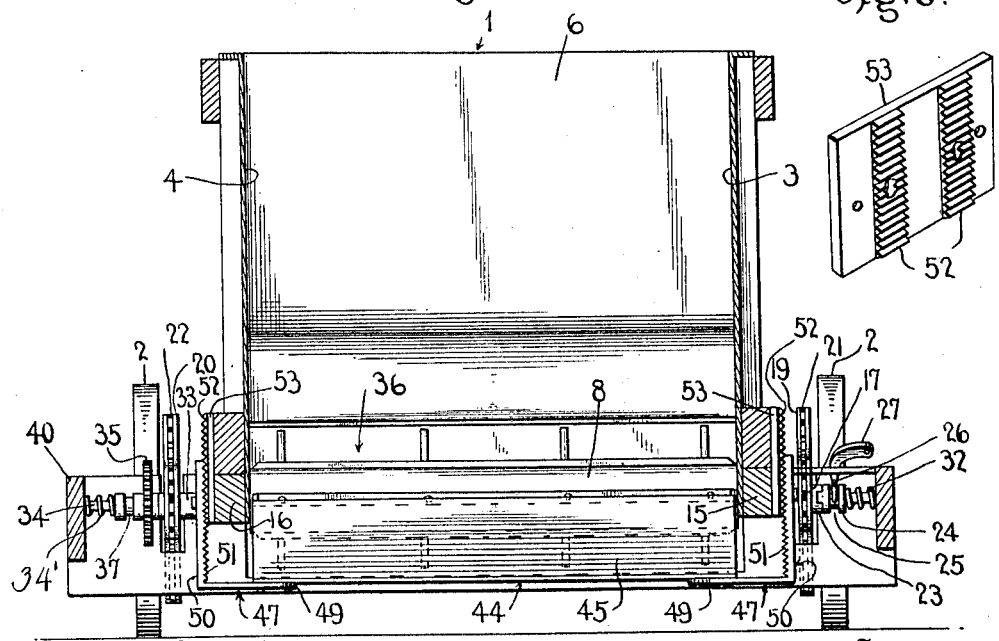
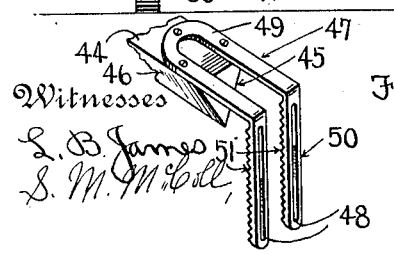
Witnesses
L. B. James
S. M. McCall
Inventor
B. F. Wilson
by H. B. Willson & Co.
Attorneys

B. F. WILSON.
STRAW SPREADER.
APPLICATION FILED APR. 16, 1912.

1,051,847.

Patented Jan. 28, 1913.
3 SHEETS—SHEET 2.

Witnesses
L. B. James
S. M. McColl

Inventor
B. F. Wilson
by H. B. Willson & Co.
Attorneys

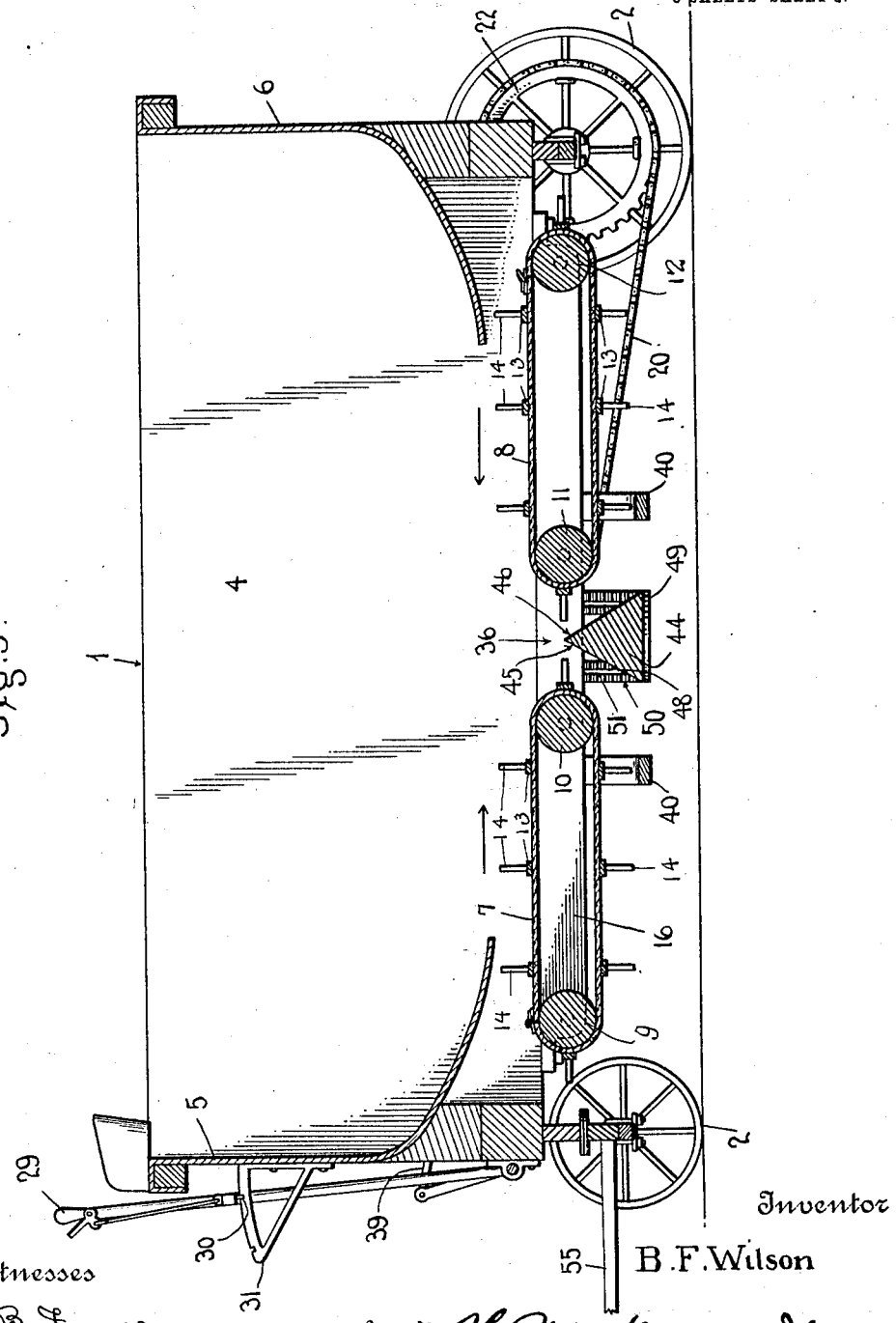

UNITED STATES PATENT OFFICE.

BENJAMIN F. WILSON, OF HASTINGS, NEBRASKA.

STRAW-SPREADER.

1,051,847.  Specification of Letters Patent.  Patented Jan. 28, 1913.

Application filed April 16, 1912. Serial No. 691,251.

*To all whom it may concern:*

Be it known that I, BENJAMIN F. WILSON, a citizen of the United States, residing at Hastings, in the county of Adams and State of Nebraska, have invented certain new and useful Improvements in Straw-Spreaders; and I do declare the following to be a full, clear, and exact description of the invention, such as will enable others skilled in the art to which it appertains to make and use the same.

This invention relates to spreaders for straw, chaff or other like material.

One object of the invention is to provide a straw spreader for delivering straw or similar material from the central portion of the body of the spreader to enable the arrangement of the mechanism at the central portion thereof to dispose the weight equally at the ends of the device, and which is so constructed that such delivery will be at a point adjacent the surface to which the material is to be applied, to prevent the straw from being scattered by the wind before it reaches said surface.

Another object is to provide simple and efficient means for adjusting the size of the distributing opening or mouth to regulate the quantity of material fed from the spreader.

Another object is to provide a spreader of this character constructed to present a smooth unobstructed surface on its inner face to permit the ready feeding of the material without any clogging.

With these and other objects in view, the invention consists of certain novel features of construction, and the combination and arrangement of parts as will be more fully described and claimed.

In the accompanying drawings:—Figure 1 represents a side elevation of a straw spreader constructed in accordance with this invention; Fig. 2 is a top plan view thereof; Fig. 3 is a longitudinal vertical section; Fig. 4 is a transverse vertical section taken on the line 4—4 of Fig. 2; Fig. 5 is a detail inverted perspective view of one end of the feed controlling device. Fig. 6 represents a detail perspective view of the toothed casting with which the adjustable feed controlling member is adapted to be connected.

In the embodiment illustrated, the body 1 of the distributer or spreader is shown rectangular and in the form of a deep wagon box, being supported in any well known manner upon wheels 2. These wheels 2 are preferably made of small size to dispose the bottom of the body near the ground, but large wheels may be used if desired and the body disposed near the surface on which the straw is to be spread, by employing drop axles or in any other suitable manner.

As shown, the body is composed of a skeleton frame, preferably constructed of wood and lined with sheet metal to present a smooth unobstructed surface to the straw or other material to be fed therefrom. This metal lining is preferably composed of side sheets 3 and 4 which cover the entire inner faces of the sides of the frame, and end sheets 5 and 6, which cover the inner faces of the ends of the frame and have their lower ends bent and extended inwardly toward the center of the body or box 1, thus forming a bottom for the box at the ends thereof, said bottom being inclined downwardly and inwardly toward the center, as shown clearly in Fig. 3. The inwardly extending lower ends of these members 5 and 6 each project over about one-fourth of the body 1 and are designed to support a portion of the weight of the load contained in the body, and thus relieve the feeding belts to be described.

Two endless conveyer belts 7 and 8 are mounted in the bottom of the frame of the spreader body on suitable rollers 9, 10 and 11 and 12, respectively. These belts may be composed of any suitable material, such as canvas, and are shown provided with transversely extending longitudinally spaced slats 13, from which project laterally pins or studs 14 which are designed to engage the straw to be distributed, and feed it toward the center of the body of the spreader, as will be hereinafter described.

The end rollers 9 and 12 are idlers, power being imparted to the bands from the rollers 10 and 11, which we will term the driving rollers. The shafts or axles of the rollers are revolubly mounted in bars 15 and 16 which are secured to the lower faces of the side members of the frame bottom, and which are so arranged to position said rollers and the feeding belts carried thereby in close proximity to the surface on which the straw or other material is to be spread. The shafts of the driving rollers 10 and 11 project at one end beyond the bars 15 and 16 at opposite sides of the spreader body and the free outer ends thereof are revolubly mounted in the end members of a frame 40 arranged transversely across the center of the body frame at the bottom thereof, being preferably secured to the bars 15 and 16 above referred to. These shafts are equipped respectively with a sprocket 17 and a gear pinion 18 which are connected by sprocket chains 19 and 20 with sprocket gears 21 and 22 fixed to the rear or driving wheels of the spreader. The sprocket pinion 17 is loosely mounted on the shaft of the rear driving roller 11 having a clutch member 23 on the outer end of the hub thereof which is adapted to be engaged by a complementary clutch member 24 keyed to slide on the roller shaft, and which is provided with the usual annular groove 25 for engagement by the forked end 26 of a clutch operating lever 27 fulcrumed intermediately at its ends on a fixed portion of the frame. A pitman rod 28 is connected to the lever 27 opposite the forked end 26 thereof, and is connected at its other end to a suitable actuating lever 29 disposed adjacent the driver's seat. This actuating lever 29 may be locked in adjusted position by the usual means, such as a spring pressed pawl 30 carried by the lever and adapted to engage a notched bar or quadrant 31 at the front of the spreader body near the driver's seat, as is shown clearly in Fig. 3. A coiled spring 32, such as is ordinarily used, is mounted on the roller shaft between the inner face of one end of the frame 40 and the outer face of the sliding clutch 24, and exerts its tension to force said clutch member normally inward into engagement with the clutch member carried by the sprocket pinion 17.

The shaft of the front driving roller 10 extends through the opposite side bar 16 and has its free outer end revolubly mounted in the other end of the transverse frame 40. The pinion 18 is fixed to the shaft of the roller 10 and is driven from the other rear supporting wheel through the sprocket chain 20 which passes over the sprocket gear on said rear supporting wheel and meshes with a sprocket pinion 33 fixed to a rotatable stub shaft 34 mounted between the side bars 16 and the end bar of the frame 40, said stub shaft 34 being disposed parallel with the shaft of the roller 10 and arranged adjacent thereto. A gear wheel or pinion 35 is keyed to slide on the stub shaft 34 and is adapted to mesh with the pinion 18, by means of which motion is imparted to the front feeding belt 7 in a direction opposite to that of the belt 8 so that said belts feed toward the center of the body 1 to convey the straw to the mouth or distributing opening 36 formed between the driving rollers 10 and 11 which are spaced apart a suitable distance to permit any desired quantity of straw to be passed between them.

The slidable gear 35 has a sleeve or hub provided with an annular groove 37 which is adapted to be engaged by the forked end of an operating lever 38 similar to the lever 27 above described, and which is also fulcrumed intermediately of its ends on a fixed portion of the frame of the spreader and is connected at its other end by a pitman 39 with an actuating lever 41 arranged at the front of the spreader adjacent the lever 29 in position for actuation by the driver. This lever 41 is also provided with a spring actuated pawl or dog 42 which is designed to engage a toothed segment or bar 43 for locking the lever in adjusted position, and thereby hold the gear wheel 35 out of mesh with the pinion 18. The spring 34' exerts its tension to normally hold the gear 35 and pinion 18 in engagement. It will, of course, be understood, that when it is desired to throw the feeding aprons out of operation, it is only necessary to shift the clutch member 24 and the gear wheel 35 out of engagement with the sprocket pinions 17 and 18 by means of the actuating levers 29 and 41.

An adjustable feed controlling member 44 is mounted transversely of the body frame below the bottom thereof, and is adapted to be raised or lowered to vary the space between the inner ends of the feeding belts 7 and 8 and thereby permit more or less straw or other material to pass through said opening to the surface on which it is to be spread. This feed controlling member 44 has inclined distributing faces 45 and 46 extending in opposite directions converging toward their upper ends to present a deflecting surface to the material fed through the opening 36 and scatter it in opposite directions. As shown, this member is made in the form of a bar triangular in cross section arranged transversely across the bottom of the spreader body below the mouth 36 with the apex thereof extending upwardly into said opening, as is shown clearly in Fig. 3. The opposite ends of this member 44 have adjusting bars or plates 47 secured thereto and extending at right angles to the apex thereof. As shown, these plates are made L-shape in form with a slot 48 extending longitudinally thereof. The inner arm 49 of each plate 47 is secured to the flat lower face of the member 44 by screws or other fastening elements, and the free arm 50 thereof projects upwardly and is provided on its inner face with serrations or teeth 51 which are adapted to mesh with similar teeth 52 formed on castings 53 secured to the outer faces of the bars 15 and 16. These castings 53 may be of any suitable or desired length, and the toothed arms 50 of the member 44 are held in engagement therewith by set screws 54 which pass through the slots in said arms and engage said castings. The member 44 is of a length equal to the space between the side bars 15 and 16, or a little less, to adapt it to move vertically between said bars to vary the size of the mouth of the spreader. A tongue 55 or other suitable draft means may be applied to the front axle of the spreader body and drawn by draft animals, or it may be attached to a traction engine if desired.

In the operation of this improved spreader, the body 1 is filled with straw, preferably cut, leaves, chaff or any other light material which is desired to be placed on wheat for mulching it or on the earth for fertilizing it, and the size of the mouth 36 is adjusted by disposing the member 44 at the desired position to feed the desired quantity of material therethrough. The drawing of the spreader over the ground causes the wheels 2 to rotate and through the sprocket chains 19 and 20 to drive the feeding rollers 10 and 11 which cause the aprons or belts 7 and 8 to travel toward the center of the spreader and thereby feed the straw to the mouth 36, the pins 14 engaging the straw and forcing it toward said mouth. When the size of the mouth is to be reduced the member 44 is moved upward, and when it is to be enlarged said member is lowered. It will be obvious that the downward inclination of the metal lining at the ends of the body will facilitate the passage of the straw toward the mouth 36 and assist the belts in feeding it thereto.

I claim as my invention:

1. A straw spreader including a box-like body with the bottom thereof open throughout the greater portion of its length, endless aprons mounted below said opening with their inner ends spaced apart, means for connecting said aprons with the driving wheels of the spreader for imparting motion thereto and causing them to travel toward the center of the spreader body, and a vertically adjustable member arranged between the inner ends of said aprons for varying the size of the opening between them.

2. A straw spreader including a box-like body with the bottom thereof open throughout the greater portion of its length, endless aprons mounted below said opening with their inner ends spaced apart, means for connecting said aprons with the driving wheels of the spreader for imparting motion thereto and causing them to travel toward the center of the spreader body, and a vertically adjustable member operable between the inner ends of said aprons and having distributing faces inclined in opposite directions, and means for locking said member in adjusted position.

3. A straw spreader including a box-like body having an opening extending transversely of the bottom thereof, a member arranged to vary the size of said opening and having toothed arms at its opposite ends, toothed bars carried by said body in position to be engaged by the arms of said adjustable member, and means for securing said toothed arms in adjusted position on said bars to hold said member in adjusted position.

4. A straw spreader including a body having an opening in the bottom thereof, a member adjustable in said opening to vary the size thereof, L-shaped arms secured to said member provided on one face with teeth, toothed bars arranged adjacent said opening in position for engagement with the toothed arms of said member, said toothed arms having longitudinal slots therein, and set screws operable in said slots and adapted to engage said bars for locking said members in adjusted position.

5. A straw spreader including a body composed of a skeleton frame having sheet metal sides secured to the inner faces of the side members of said frame, sheet metal plates secured to the inner faces of the end members of said frame with their lower ends extending inwardly over a portion of the bottom of the frame, said end members being inclined downwardly and inwardly, endless conveyers supported in the bottom between said end plates, means under the control of the driver for throwing said aprons into and out of operation, the inner ends of said aprons being spaced apart to form a distributing mouth extending transversely across the bottom of the spreader, and means for varying the size of said mouth.

6. A straw spreader including a body composed of a skeleton frame having sheet metal sides secured to the inner faces of the side members of said frame, sheet metal plates secured to the inner faces of the end members of said frame with their lower ends extending inwardly over a portion of the bottom of the frame, said end members being inclined downwardly and inwardly, endless conveyers supported in the bottom between said end plates, means under the control of the driver for throwing said aprons into and out of operation, the inner ends of said apron being spaced apart to form a distributing mouth extending transversely across the bottom of the spreader, and means for varying the size of said mouth, the bottom of said spreader being disposed adjacent to the supporting surface of the spreader.

7. A straw spreader including a wheel supported body having an opening in the bottom thereof, side bars depending from the opposite side bars of said body, longitudinally spaced rollers having the axles thereof revolubly mounted in said depending side bars, endless aprons supported on said rollers, sprocket gears fixed to the drive wheels of said spreader, one end of the axle of each of the driving rollers projecting beyond the side bars at opposite sides of said body, means for supporting the free ends of said axles, a sprocket pinion on one of said projecting axle ends and a gear pinion on the other axle end, a sprocket chain connecting the sprocket gear of one of said driving wheels with the sprocket pinion on the rear driving roller, said sprocket pinion being loosely mounted on the axle of said roller, a clutch member keyed to said axle and adapted to engage said pinion for locking it to said axle, the pinion on the axle of the front driving roller being fixed thereto, a stub shaft mounted parallel with said projecting axle end and having a sprocket pinion fixed thereto, a chain connecting said sprocket pinion with the sprocket gear on the other driving wheel of the spreader, and a pinion slidably mounted on said stub shaft and shiftable into and out of engagement with the fixed sprocket wheel on the roller shaft, and means under the control of the driver for shifting said clutch and slidable pinion.

In testimony whereof I have hereunto set my hand in presence of two subscribing witnesses.

BENJAMIN F. WILSON.

Witnesses:
L. O. HILTON,
G. W. MUDD.